(12) United States Patent
Lee et al.

(10) Patent No.: US 10,587,016 B2
(45) Date of Patent: Mar. 10, 2020

(54) SYSTEM AND METHOD FOR SENSING BATTERY CELL SWELLING

(71) Applicant: LG CHEM, LTD., Seoul (KR)

(72) Inventors: Jae-Chan Lee, Daejeon (KR);
Sooryoung Kim, Daejeon (KR);
Cheoltaek Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 43 days.

(21) Appl. No.: 15/540,308

(22) PCT Filed: Jun. 10, 2016

(86) PCT No.: PCT/KR2016/006196
§ 371 (c)(1),
(2) Date: Jun. 28, 2017

(87) PCT Pub. No.: WO2016/200212
PCT Pub. Date: Dec. 15, 2016

(65) Prior Publication Data
US 2018/0006342 A1    Jan. 4, 2018

(30) Foreign Application Priority Data
Jun. 10, 2015  (KR) .......................... 10-2015-0082100

(51) Int. Cl.
*H01M 10/48*   (2006.01)
*H01M 10/42*   (2006.01)
(Continued)

(52) U.S. Cl.
CPC ........... *H01M 10/488* (2013.01); *H01M 2/34* (2013.01); *H01M 2/345* (2013.01);
(Continued)

(58) Field of Classification Search
CPC ....................... H01M 10/486; H01M 10/4257
See application file for complete search history.

(56) References Cited

U.S. PATENT DOCUMENTS

2004/0247994 A1   12/2004   Masuda et al.
2006/0246345 A1   11/2006   Yoon et al.
(Continued)

FOREIGN PATENT DOCUMENTS

CN       1463476 A      12/2003
CN       201742214 U     2/2011
(Continued)

OTHER PUBLICATIONS

European Search Report for Appl. No. 16807852.5 dated Dec. 11, 2017.
(Continued)

*Primary Examiner* — Olatunji A Godo
(74) *Attorney, Agent, or Firm* — Birch, Stewart, Kolasch & Birch, LLP (57) ABSTRACT

The present invention relates to a system and a method of detecting swelling of a battery cell, which, when abnormal swelling is generated in a battery cell embedded in a battery pack, rapidly detect the abnormal swelling and control a supply of a power source to the battery pack to be blocked, thereby preventing a structural deformation of the battery cell and the battery pack and life shortening of the battery, and preventing an accident, such as ignition and explosion.

20 Claims, 4 Drawing Sheets

(51) Int. Cl.
  *H01M 2/34*      (2006.01)
  *H01M 10/613*    (2014.01)
  *H01M 10/625*    (2014.01)
  *H01M 10/6561*   (2014.01)
  *H01M 10/6567*   (2014.01)

(52) U.S. Cl.
  CPC ......... *H01M 10/425* (2013.01); *H01M 10/48* (2013.01); *H01M 10/613* (2015.04); *H01M 10/625* (2015.04); *H01M 10/6561* (2015.04); *H01M 10/6567* (2015.04); *H01M 2010/4271* (2013.01); *H01M 2200/20* (2013.01); *H01M 2220/20* (2013.01)

(56) References Cited

U.S. PATENT DOCUMENTS

2013/0249494 A1*  9/2013  Ju ........................ H02J 7/0029
                                                    320/134
2016/0268644 A1   9/2016  Lee et al.

FOREIGN PATENT DOCUMENTS

| CN | 202585672 U | 12/2012 |
| EP | 2 645 527 A1 | 10/2013 |
| JP | 2002-117911 A | 4/2002 |
| JP | 2009-76265 A | 4/2009 |
| JP | 2009-076265 A | 4/2009 |
| KR | 10-2007-0075927 A | 7/2007 |
| KR | 10-2009-0131573 A | 12/2009 |
| KR | 10-0964175 B1 | 6/2010 |
| KR | 10-2015-0012793 A | 2/2015 |

OTHER PUBLICATIONS

International Search Report (PCT/ISA/210) issued in PCT/KR2016/006196, dated Sep. 19, 2016.

\* cited by examiner

SYSTEM AND METHOD FOR SENSING BATTERY CELL SWELLING

TECHNICAL FIELD

This application claims priority to and the benefit of Korean Patent Application No. 10-2015-0082100 filed in the Korean Intellectual Property Office on Jun. 10, 2015, the entire contents of which are incorporated herein by reference.

The present invention relates to a system for detecting swelling of a battery cell, and more particularly, to a system and a method of detecting swelling of a battery cell, in which pressure measuring sensors are provided in spaces having predetermined intervals formed between one or more battery cells, respectively, and a pressure applied to the pressure measuring sensors according to a change in volume of each of the one or more battery cells is measured to control a supply of an external power source based on the measurement result, thereby preventing an accident, such as ignition and explosion, generable by a swelling phenomenon of the battery cell and a structural deformation of a battery cell and a battery pack.

BACKGROUND ART

A battery has a characteristic in an easy application according to a product group, excellent preservability, a high energy density, and the like. Further, the battery attracts attention as an energy source for improving an environmentally-friendly characteristic and energy efficiency in that a by-product according to the use of energy is not generated, as well as a primary advantage in that it is possible to decrease the use of fossil fuel.

Because of this, the battery is universally applied to a portable device, an electric vehicle (EV), and an energy storage system (ESS), and serves as a basis in various industries and simultaneously provide convenience to everyday life.

However, the battery may be abnormally driven according to a use environment, and the abnormal driving of the battery causes various accidents, so that it is required to stably protect the battery through careful monitoring and an appropriate control.

For example, when the battery is put in an abnormal environment, such as overcharging, short-circuit, and reverse access, or a life of the battery is exhausted, gas is generated inside the battery by an electrochemical action, and the excessive gas generation causes a swelling phenomenon of the battery.

The swelling phenomenon of the battery may lead to an accident, such as ignition and explosion, as well as life shortening and capacity decrease of the battery, so that there is concern in safety.

Accordingly, the related art presents various technologies for detecting a swelling phenomenon of a battery, and for example, Korean Patent Application Laid-Open No. 10-2009-0131573 discloses an apparatus for cutting power during overcharging of a battery, in which when a swelling phenomenon is generated in a battery, a connection between an electrode assembly and an electrode lead is broken, so that a power connection unit between cells is disconnected, thereby preventing overcharging.

However, in the related art, only when some elements are broken due to the swelling phenomenon of the battery, the overcharging is prevented, so that it is not easy to re-use the battery through regeneration, and a spark generable during the break acts as an ignition source, so that there is a possibility that the spark is another reason of ignition.

DETAILED DESCRIPTION OF THE INVENTION

Technical Problem

The present invention is conceived to solve the aforementioned problems, and an object of the present invention is to provide a system and a method of detecting swelling of a battery cell, in which pressure measuring sensors are provided in spaces having predetermined intervals formed between one or more battery cells, respectively, and a pressure applied to the pressure measuring sensors according to a change in volume of each of the one or more battery cells is measured to control a supply of an external power source based on the measurement result, thereby preventing an accident, such as ignition and explosion, generable by a swelling phenomenon of the battery cell and a structural deformation of a battery cell and a battery pack.

Further, an object of the present invention is to provide a system and a method of detecting swelling of a battery cell, which block a supply of a power source and simultaneously control peripheral devices, such as a fan and a cooling valve, to be operated to be off when a battery cell is abnormally swelled, thereby preventing power consumption according to unnecessary driving of the peripheral devices.

Technical Solution

A system for detecting swelling of a battery cell according to an exemplary embodiment of the present invention includes: one or more battery cells embedded in a battery pack; a detecting unit which includes pressure measuring sensors and measures a pressure applied to the pressure measuring sensor according to a change in volume of each of the one or more battery cells; a switch unit provided in a connection path between the battery pack and an external power source; and a control unit which controls an opening/closing operation of the switch unit based on a measurement result of the detecting unit.

The system may further include an output unit which outputs a state of the one or more battery cells and the opening/closing operation of the switch unit.

The one or more battery cells may form a space having a predetermined interval and may be embedded in the battery pack.

The pressure measuring sensor may be provided between an internal wall of the battery pack and the battery cell adjacent to the internal wall of the battery pack, and to each of the spaces.

The detecting unit may convert a pressure applied to each of the pressure measuring sensors into a voltage value or a current value and provide the converted voltage value or current value to the control unit.

The control unit may compare the voltage value or the current value received from the detecting unit with a predetermined threshold value, and when the voltage value or the current value exceeds the predetermined threshold value, the control unit may provide an opening operation signal to the switch unit.

When the voltage value or the current value exceeds the predetermined threshold value, the control unit may provide an off operation signal to a separate peripheral device, and the separate peripheral device may be one of an air-cooling type fan and a water-cooling type cooling valve.

When the voltage value or the current value does not exceed the predetermined threshold value, the control unit may provide a closing operation signal to the switch unit.

When the voltage value or the current value exceeds the predetermined threshold value, the output unit may output a warning signal in a form of an image and a voice.

The switch unit may be formed of one or more of a field effect transistor and a relay.

A method of detecting swelling of a battery cell according to another exemplary embodiment of the present invention includes: measuring pressures applied to pressure measuring sensors according to a change in volume of each of one or more battery cells embedded in a battery pack; and controlling an opening/closing operation of a switch provided in a connection path between the battery pack and an external power source based on a result of the measurement in the measuring of the pressures applied to the pressure measuring sensors.

The method may further include outputting a state of the one or more battery cells and the opening/closing operation of the switch.

The one or more battery cells may form a space having a predetermined interval and may be embedded in the battery pack.

The pressure measuring sensor may be provided between an internal wall of the battery pack and the battery cell adjacent to the internal wall of the battery pack, and to each of the spaces.

The measuring of the pressures applied to the pressure measuring sensors may include converting the pressure applied to each of the pressure measuring sensors into a voltage value or a current value and controlling the opening/closing operation of the switch.

The controlling of the opening/closing operation of the switch may include comparing the voltage value or the current value received from the measuring of the pressures applied to the pressure measuring sensors with a predetermined threshold value, and controlling the switch to be operated to open when the voltage value or the current value exceeds the predetermined threshold value.

The controlling of the opening/closing operation of the switch may include controlling a separate peripheral device to be operated to be off when the voltage value or the current value exceeds the predetermined threshold value, and the separate peripheral device may be one of an air-cooling type fan and a water-cooling type cooling valve.

The controlling of the opening/closing operation of the switch may include controlling the switch to be operated to be closed when the voltage value or the current value does not exceed the predetermined threshold value.

The outputting of the state of the one or more battery cells and the opening/closing operation of the switch unit may include outputting a warning signal in a form of an image and a voice when the voltage value or the current value exceeds the predetermined threshold value.

The switch may be formed of one or more of a field effect transistor and a relay.

Advantageous Effects

According to one aspect of the present invention, it is possible to provide the system and the method of detecting swelling of a battery cell, which, when an abnormal swelling phenomenon is generated in a battery cell embedded in a battery pack, rapidly detect the abnormal swelling phenomenon and control an operation of a switch in a connection path between the battery pack and an external power source so that a supply of a power source to the battery pack is blocked.

Accordingly, the present invention has an advantage in that it is possible to prevent life shortening and a structural deformation of a battery by an abnormal swelling phenomenon of a battery cell, and prevent an accident, such as ignition and explosion.

Further, the present invention blocks a supply of a power source to a battery pack and simultaneously controls peripheral devices to be operated to be off, thereby achieving an effect in preventing power consumption according to unnecessary driving.

BEST MODE

The present invention will be described in detail below with reference to the accompanying drawings. Herein, repeated descriptions and the detailed description of a publicly known function and configuration that may make the gist of the present invention unnecessarily ambiguous will be omitted. Exemplary embodiments of the present invention are provided so as to more completely explain the present invention to those skilled in the art. Accordingly, the shape, the size, etc., of elements in the figures may be exaggerated for more clear explanation.

Throughout the specification, unless explicitly described to the contrary, the word "include/comprise" and variations such as "includes/comprises" or "including/comprising" mean further including other constituent elements, not excluding the other constituent elements.

In addition, the term " . . . unit" described in the specification means a unit for processing at least one function and operation and may be implemented by hardware components or software components and combinations thereof.

Figure 1:
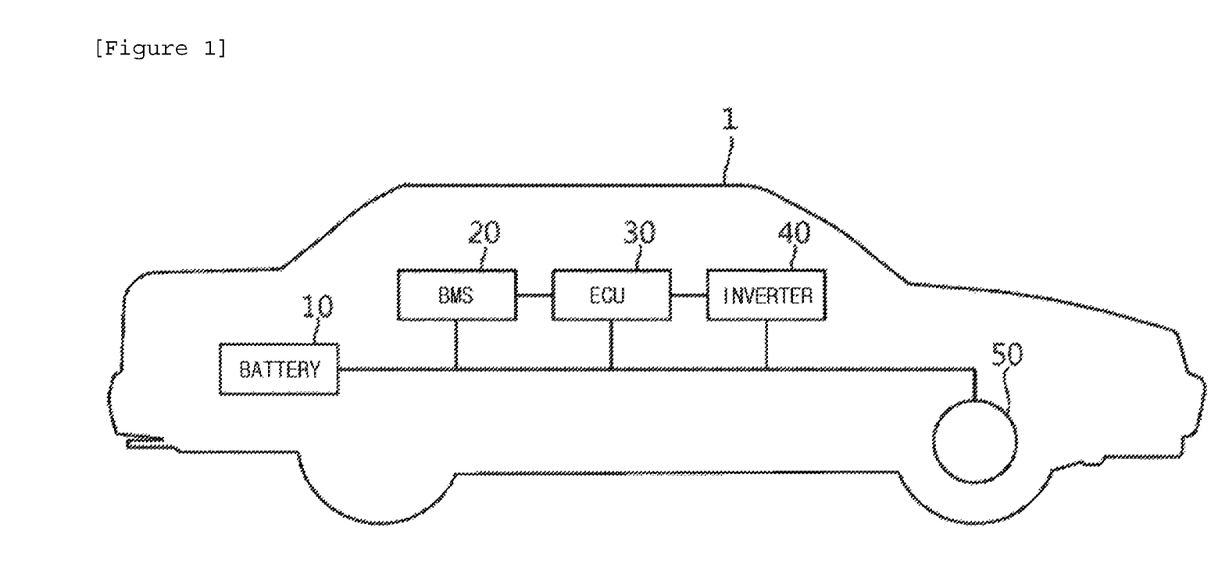
FIG. 1 is a diagram schematically illustrating an electric vehicle, to which a system and a method of detecting swelling of a battery cell according to an exemplary embodiment of the present invention are applicable.

FIG. 1 is a diagram schematically illustrating an electric vehicle, to which a system and a method of detecting swelling of a battery cell according to an exemplary embodiment of the present invention are applicable.

However, it is noted that the system and the method of detecting swelling of a battery cell according to the exemplary embodiment of the present invention are applicable to various technical fields, to which a battery is applied, in addition to an electric vehicle 1.

Referring to FIG. 1, the electric vehicle 1 may include a battery 10, a battery management system (BMS) 20, an electronic control unit (ECU) 30, an inverter 40, and a motor 50.

The battery 10 is an electric energy source providing driving force to the motor 50 and driving the electric vehicle 1, and may be charged or discharged by the inverter 40 according to the driving of the motor 50 and/or an internal combustion engine (not illustrated).

The BMS 20 may estimate a state of the battery 10 and control a charging/discharging current of the battery 10 by using information about the state, and further control an opening/closing operation of a contactor.

The ECU 30 is an electronic control device for controlling a state of the electric vehicle 1. For example, the ECU 30 determines a torque level based on information about an accelerator, a brake, a speed, and the like, and controls an output of the motor 50 to correspond to torque information.

The inverter 40 makes the battery 10 be charged or discharged based on a control signal of the ECU 30.

The motor 50 drives the electric vehicle 1 based on electric energy of the battery 10 and control information transmitted from the ECU 30.

As described above, in the electric vehicle 1, the battery 10 is a core element providing momentum, and when the battery 10 is in an abnormal state, a failure of the electric vehicle 1 and various accidents may occur.

For example, when the battery 10 is put in an environment, such as overcharging, short-circuit, and reverse access, or a life of the battery is exhausted, an internal pressure of the battery 10 is increased by a generation of gas due to an electric and chemical action inside the battery 10, so that the battery 10 may be expanded to cause explosion or ignition.

Accordingly, an appropriate protection of the battery is connected with a stable operation of machine equipment and a device, to which the battery is applied, and hereinafter, the system and the method of detecting swelling of the battery cell according to the exemplary embodiment of the present invention will be described with reference to FIGS. 2 to 4.

Figure 2:
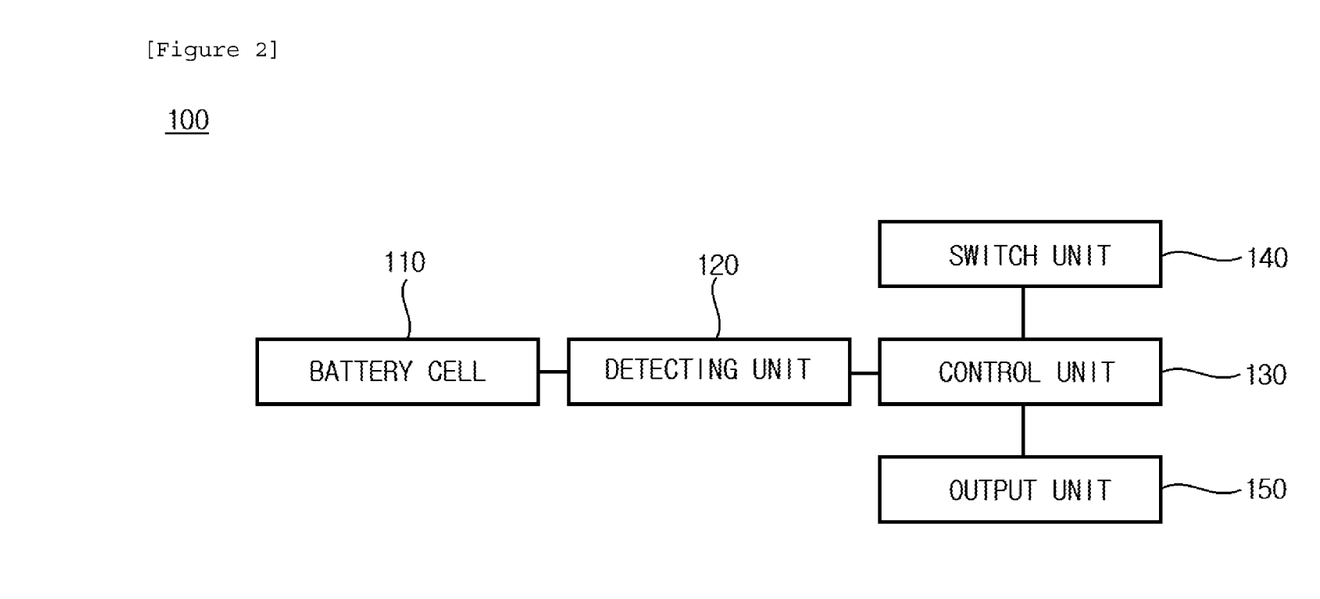
FIG. 2 is a diagram schematically illustrating a configuration of a system for detecting swelling of a battery cell according to an exemplary embodiment of the present invention.
Figure 3:
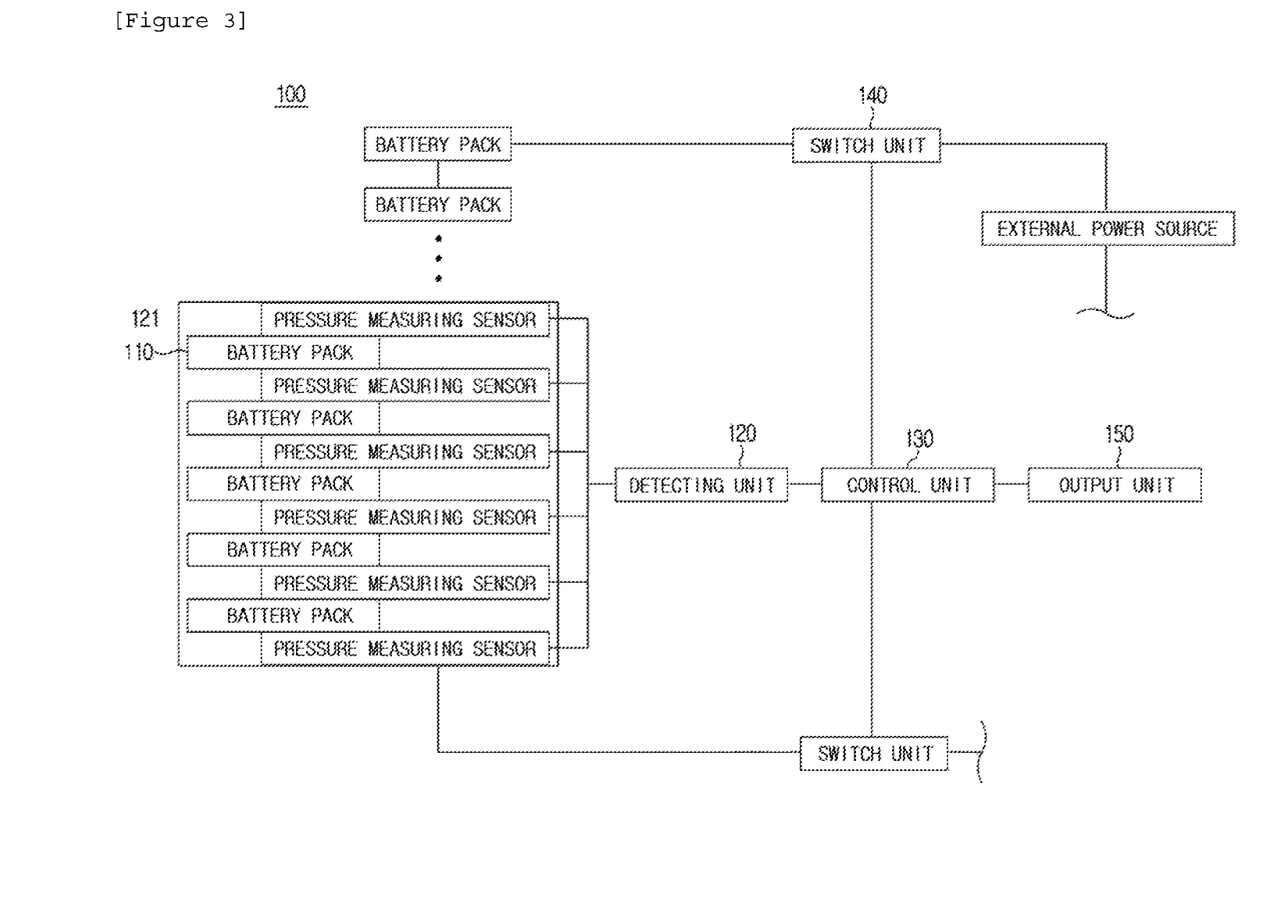
FIG. 3 is a diagram schematically illustrating a circuit diagram of the system for detecting swelling of the battery cell according to the exemplary embodiment of the present invention.

FIG. 2 is a diagram schematically illustrating a configuration of the system for detecting swelling of a battery cell according to the exemplary embodiment of the present invention, and FIG. 3 is a diagram schematically illustrating a circuit diagram of the system for detecting swelling of the battery cell.

Referring to FIGS. 2 and 3, the system 100 for detecting the swelling of the battery cell according to the exemplary embodiment of the present invention may include one or more battery cells 110, a detecting unit 120, a control unit 130 a switch unit 140, and an output unit 150.

However, the system 100 for detecting the swelling of the battery cell illustrated in FIGS. 2 and 3 is an exemplary embodiment, and constituent elements thereof are not limited to the exemplary embodiment illustrated in FIGS. 2 and 3, and it is noted that some constituent elements may be added, changed, or removed as necessary.

One or more battery cells 110 may form a space between the cells and may be embedded in a battery pack. Particularly, the one or more battery cells 110 are serially connected, and in this case, the one or more battery cells 110 may be spaced apart from each other by a predetermined interval to form a space having a predetermined size.

The size of the space may be determined in accordance with a thickness of a pressure measuring sensor 121 to be described below so that the pressure measuring sensor 121 may be inserted between left and right battery cells 110 while being in contact with the left and right battery cells 110.

Here, the kind of battery including the battery cell 110 and the battery pack is not particularly limited, and examples of the battery may include a lithium ion battery, a lithium polymer battery, a nickel cadmium battery, a nickel hydrogen battery, and a nickel zinc battery.

The detecting unit 120 may be provide inside or at one external side of the battery pack to serve to detect a change in volume of each of the one or more battery cells 110.

Particularly, the detecting unit 120 includes one or more pressure measuring sensors 121, and each pressure measuring sensor 121 may be inserted into the space formed by the one or more battery cells 110 while corresponding to the space one to one. Further, the pressure measuring sensor 121 may also be inserted into a space formed by the outermost battery cell among the one or more battery cells 110 and an inner wall of the battery pack.

That is, one surface of each of the one or more battery cells 110 and one surface of the pressure measuring sensor 121 may be in close contact with each other to compactly fill in an internal space of the battery pack, so that when a change in volume is generated in each of the one or more battery cells 110, a pressure may be applied to the closely contacted pressure measuring sensor 121.

As described above, the pressure measuring sensor 121 is inserted into the space formed by the one or more battery cells 110, and the battery cell 110 is in close contact with the pressure measuring sensor 121, so that it is possible to sensitively detect a pressure according to a change in volume of the battery cell 110 and improve space utilization inside the battery pack.

Each of the one or more pressure measuring sensors 121 may measure a pressure applied according to a change in volume of each of the one or more battery cells 110, and in this case, the pressure measuring sensor 121 may measure all of the pressures applied from the closely contacted left and right battery cells 110 or measure a relatively higher applied pressure between the pressures applied from the left and right battery cells 110 and provide the measured pressure to the detecting unit 120.

The detecting unit 120 may convert the measured pressure into an electric value, such as a voltage value or a current value, and provide the converted electric value to the control unit 130 to be described below.

The control unit 130 may serve to control an opening/closing operation of the switch unit 140 to be described below based on the voltage value or the current value provided from the detecting unit 120, and may be implemented as a BMS itself or may be included in the BMS.

A threshold value for determining swelling of the battery cell 110 through a comparison with the voltage value or the current value may be set in the control unit 130.

Particularly, the control unit 130 compares the voltage value or the current value with the predetermined threshold value, and when the voltage value or the current value exceeds the predetermined threshold value, the control unit 130 may provide an opening operation signal to the switch unit 140, and simultaneously provide an off operation signal to peripheral devices (not illustrated), a circuit component, and the like related to the driving of the battery to prevent power consumption according to unnecessary driving of the peripheral devices and the circuit component.

Herein, the peripheral devices may include an air-cooling type fan, a water-cooling type cooling valve, and the like.

Further, when the voltage value or the current value does not exceed the predetermined threshold value, the control unit 130 may provide a closing operation signal to the switch unit 140.

One or more switch units 140 may be provided in a connection path between the battery pack and an external power source, and may open or close the connection path between the battery pack and the external power source according to the operation signal received from the control unit 130.

That is, when the opening operation signal is provided from the control unit 130, the switch unit 140 may be operated to open to block a path of a current supplied to the battery pack from the external power source, and in contrast to this, when the closing operation signal is provided from the control unit 130, the switch unit 140 may maintain the closing operation.

The switch unit 140 may be formed of one or more between a field effect transistor and a relay, but it is noted that the kind of contactor forming the switch unit 140 is not limited and may be variously selected.

The output unit 150 may serve to output information about a state, such as a change in volume, of the battery cell 110, a charging/discharging state according to the opening/closing operation of the switch unit 140, and the like.

For example, the output unit 150 may be implemented with a terminal device, such as a computer, a mobile phone, a personal digital assistant (PDA), and a portable multimedia player (PMP), and may be implemented with various types of device capable of performing data input/output.

Information output from the output unit 150 may be displayed as an image or may be provided as a voice. Particularly, when the voltage value or the current value exceeds the threshold value as a result of the comparison between the voltage value or the current value and the threshold value by the control unit 130, the output unit 150 may output a warning signal in a form of an image and a voice.

Figure 4:
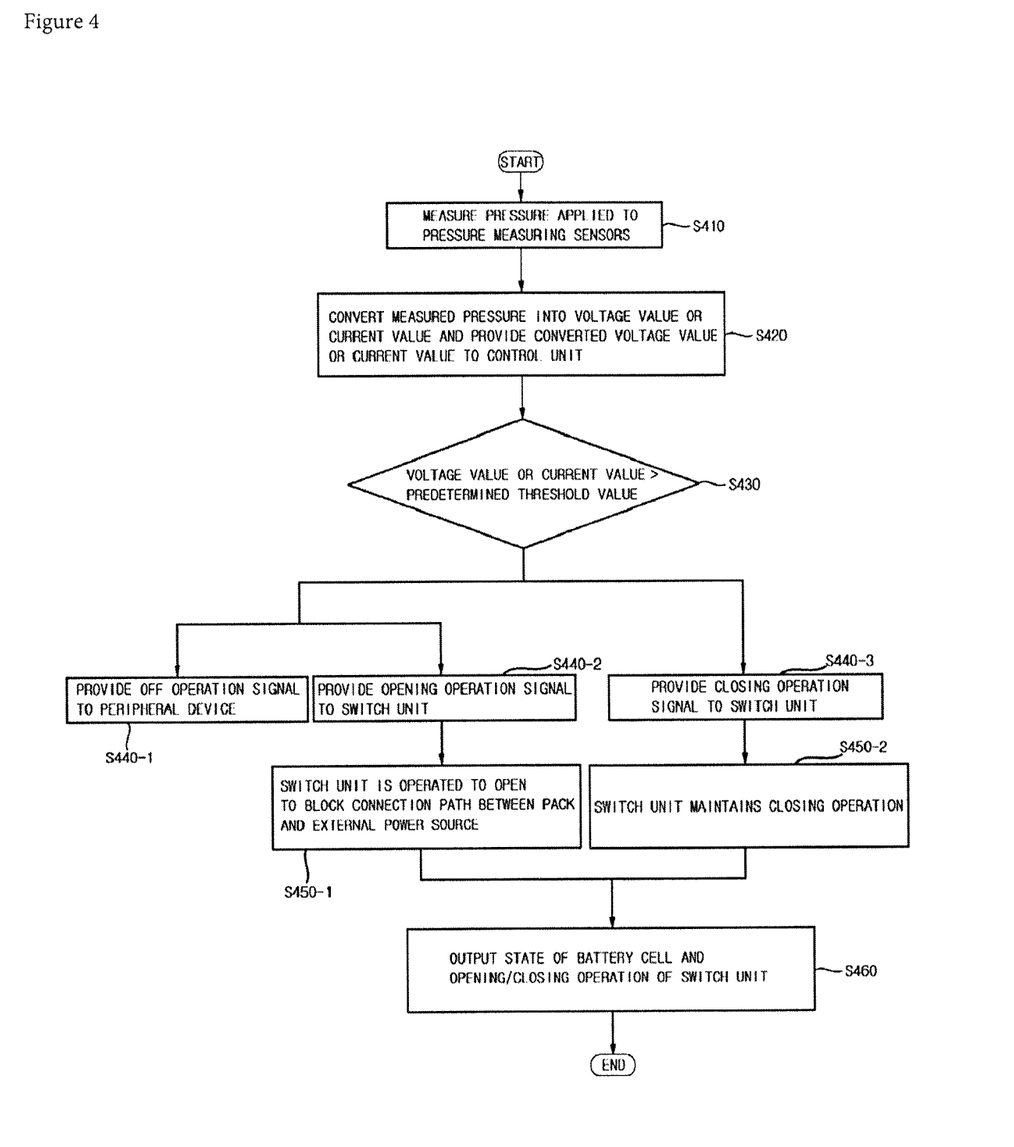
FIG. 4 is a flowchart illustrating a method of detecting swelling of a battery cell according to an exemplary embodiment of the present invention.

FIG. 4 is a flowchart illustrating a method of detecting swelling of a battery cell according to an exemplary embodiment of the present invention.

When the method of detecting swelling of the battery cell according to the exemplary embodiment of the present invention starts, a pressure applied to a pressure measuring sensor according to a change in volume of a battery cell is first measured (S410), and the pressure measured by a detecting unit is converted into an electric value, such as a voltage value or a current value, and the converted electric value is provided to a control unit (S420). The control unit compares the voltage value or the current value with a predetermined threshold value (S430), and when the voltage value or the current value exceeds the predetermined threshold value, the control unit provides an off operation signal to peripheral devices related to the driving of a battery (S440-1) and provides an opening operation signal to the switch unit (S440-2). Accordingly, the peripheral devices are operated to be off, and the switch unit is operated to open to block a connection path between a battery pack and an external power source (S450-1).

When the voltage value or the current value does not exceed the predetermined threshold value, the control unit provides a closing operation signal to the switch unit (S440-3), so that the switch unit maintains the closing operation (S450-2).

Then, the output unit outputs information about a state, such as a change in volume, of the battery cell, a charging/discharging state of the battery pack according to the opening/closing operation of the switch unit, and the like in a form of an image and a voice (S460).

In the forgoing, the specific exemplary embodiment of the present invention has been illustrated and described, but it is apparent to those skilled in the art that the technical spirit of the present invention is not limited by the accompanying drawings and the described contents, and may be modified in various forms without departing from the spirit of the present invention, and the modifications are considered to belong to the claims of the present invention without departing from the spirit of the present invention.

The invention claimed is:

1. A system for detecting swelling of one or more battery cells embedded in a battery pack, the system comprising:
   a detecting unit which includes pressure measuring sensors, wherein the detecting unit is configured to measure pressure applied directly to each pressure measuring sensor by a respective one of the one or more battery cells due to a change in volume of the respective one of the one or more battery cells;
   a switch unit provided in a connection path between the battery pack and an external power source; and
   a control unit which controls an opening/closing operation of the switch unit based on a measurement result of the detecting unit,
   wherein at least a first pressure measuring sensor among the pressure measuring sensors is provided in a space directly between adjacent battery cells among the one or more battery cells, and
   wherein a second pressure measuring sensor among the pressure measuring sensors is provided in a space formed by an outermost battery cell among the one or more battery cells and an inner wall of the battery pack.

2. The system of claim 1, further comprising:
   an output unit which outputs a state of the one or more battery cells and the opening/closing operation of the switch unit.

3. The system of claim 1, wherein the one or more battery cells form a space having a predetermined interval and are embedded in the battery pack.

4. The system of claim 3, wherein a third pressure measuring sensor among the pressure measuring sensors is provided directly between the inner wall of the battery pack and another battery cell adjacent to the inner wall of the battery pack, and
   wherein the pressure measuring sensors are provided to each of the spaces.

5. The system of claim 4, wherein the detecting unit converts a pressure applied to each of the pressure measuring sensors into a voltage value or a current value and provides the converted voltage value or current value to the control unit.

6. The system of claim 5, wherein the control unit compares the voltage value or the current value received from the detecting unit with a predetermined threshold value, and when the voltage value or the current value exceeds the predetermined threshold value, the control unit provides an opening operation signal to the switch unit.

7. The system of claim 6, wherein when the voltage value or the current value exceeds the predetermined threshold value, the control unit provides an off operation signal to a separate peripheral device, and
   wherein the separate peripheral device is one of an air-cooling type fan and a water-cooling type cooling valve.

8. The system of claim 6, wherein when the voltage value or the current value does not exceed the predetermined threshold value, the control unit provides a closing operation signal to the switch unit.

9. The system of claim 8, further comprising:
   an output unit which outputs a state of the one or more battery cells and the opening/closing operation of the switch unit, wherein when the voltage value or the current value exceeds the predetermined threshold value, the output unit outputs a warning signal in a form of an image and a voice.

10. The system of claim 1, wherein the switch unit is formed of one or more of a field effect transistor and a relay.

11. A method of detecting swelling of one or more battery cells embedded in a battery pack, the method comprising:
measuring pressures directly applied to pressure measuring sensors by the one or more battery cells according to a change in volume of the one or more battery cells; and
controlling an opening/closing operation of a switch provided in a connection path between the battery pack and an external power source based on a result of the measurement in the measuring of the pressures applied to the pressure measuring sensors,
wherein at least a first pressure measuring sensor among the pressure measuring sensors is provided in a space directly between adjacent battery cells among the one or more battery cells, and
wherein a second pressure measuring sensor among the pressure measuring sensors is provided in a space formed by an outermost battery cell among the one or more battery cells and an inner wall of the battery pack.

12. The method of claim 11, further comprising:
outputting a state of the one or more battery cells and the opening/closing operation of the switch.

13. The method of claim 11, wherein the one or more battery cells form a space having a predetermined interval and are embedded in the battery pack.

14. The method of claim 13, wherein a third pressure measuring sensor is provided directly between the inner wall of the battery pack and another battery cell adjacent to the inner wall of the battery pack, and
wherein the pressure measuring sensors are provided to each of the spaces.

15. The method of claim 14, wherein the measuring of the pressures applied to the pressure measuring sensors includes converting the pressure applied to each of the pressure measuring sensors into a voltage value or a current value and controlling the opening/closing operation of the switch.

16. The method of claim 15, wherein the controlling of the opening/closing operation of the switch includes comparing the voltage value or the current value received from the measuring of the pressures applied to the pressure measuring sensors with a predetermined threshold value, and controlling the switch to be operated to open when the voltage value or the current value exceeds the predetermined threshold value.

17. The method of claim 16, wherein the controlling of the opening/closing operation of the switch includes controlling a separate peripheral device to be operated to be off when the voltage value or the current value exceeds the predetermined threshold value, and
wherein the separate peripheral device is one of an air-cooling type fan and a water-cooling type cooling valve.

18. The method of claim 16, wherein the controlling of the opening/closing operation of the switch includes controlling the switch to be operated to be closed when the voltage value or the current value does not exceed the predetermined threshold value.

19. The method of claim 18, further comprising:
outputting a state of the one or more battery cells and the opening/closing operation of the switch unit,
wherein the outputting of the state of the one or more battery cells and the opening/closing operation of the switch unit includes outputting a warning signal in a form of an image and a voice when the voltage value or the current value exceeds the predetermined threshold value.

20. The method of claim 11, wherein the switch is formed of one or more of a field effect transistor and a relay.

* * * * *